US012387210B2

(12) United States Patent
Torkelson et al.

(10) Patent No.: US 12,387,210 B2
(45) Date of Patent: *Aug. 12, 2025

(54) TRANSIENT TRANSACTION SERVER DNS STRATEGY

(71) Applicant: Stratus Digital Systems, Eugene, OR (US)

(72) Inventors: Cary Torkelson, Eugene, OR (US); Kenneth Ari Chanin, Savannah, GA (US); Patrick J. Sullivan, Eugene, OR (US); Brad Geankoplis, Gold River, CA (US)

(73) Assignee: Stratus Digital Systems, Eugene, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/357,924

(22) Filed: Jul. 24, 2023

(65) Prior Publication Data

US 2023/0368203 A1 Nov. 16, 2023

Related U.S. Application Data

(63) Continuation of application No. 17/139,756, filed on Dec. 31, 2020, now Pat. No. 11,741,466, which is a
(Continued)

(51) Int. Cl.
*H04L 67/62* (2022.01)
*G06Q 20/38* (2012.01)
(Continued)

(52) U.S. Cl.
CPC ......... *G06Q 20/401* (2013.01); *G06Q 20/382* (2013.01); *G06Q 20/40* (2013.01);
(Continued)

(58) Field of Classification Search
CPC .......................... H04L 63/166; H04L 67/1014
(Continued)

(56) References Cited

U.S. PATENT DOCUMENTS 6,009,266 A 12/1999 Brownell et al.
8,689,307 B2 4/2014 Chaturvedi et al.
(Continued)

FOREIGN PATENT DOCUMENTS

CN 109792446 A 5/2019
JP 2019537167 A 12/2019
(Continued)

OTHER PUBLICATIONS

Jeanna, M., et al. "Virtual machine contracts for datacenter and cloud computing environments," Proceedings of the 1st workshop on Automated control for datacenters and clouds, pp. 25-30 (Jun. 2009).
(Continued)

*Primary Examiner* — Anthony D Brown
(74) *Attorney, Agent, or Firm* — Kim & Stewart LLP

(57) ABSTRACT

A networked computer system enables a transaction to be executed securely. An initiator sends a service request to a control server. The control server creates a transaction server for the sole purpose of execution of the transaction requested by the service request. Creating the transaction server includes: selecting an IP address randomly from a pool of IP addresses and assigning the selected IP address to the transaction server; creating a DNS entry including a randomly-constructed hostname; and associating the DNS entry with the selected IP address. If the transaction server preexists, it is made accessible in response to receiving the service request. The control server informs the initiator of the created transaction server. The initiator engages in the transaction with the transaction server, independently of the
(Continued)

control server. The transaction server terminates upon completion of the transaction or the expiration of a timeout period.

20 Claims, 10 Drawing Sheets

Related U.S. Application Data continuation of application No. 16/142,559, filed on Sep. 26, 2018, now abandoned, said application No. 17/139,756 is a continuation-in-part of application No. 16/848,472, filed on Apr. 14, 2020, now abandoned, which is a continuation of application No. 15/720,932, filed on Sep. 29, 2017, now Pat. No. 10,715,538.

(60) Provisional application No. 62/565,795, filed on Sep. 29, 2017, provisional application No. 62/503,562, filed on May 9, 2017, provisional application No. 62/403,587, filed on Oct. 3, 2016.

(51) Int. Cl.

| | |
|---|---|
| *G06Q 20/40* | (2012.01) |
| *H04L 9/40* | (2022.01) |
| *H04L 41/5054* | (2022.01) |
| *H04L 61/4511* | (2022.01) |
| *H04L 67/1014* | (2022.01) |
| *H04L 67/63* | (2022.01) |
| *H04L 61/5007* | (2022.01) |
| *H04L 61/5061* | (2022.01) |

(52) U.S. Cl.
CPC ...... *H04L 41/5054* (2013.01); *H04L 61/4511* (2022.05); *H04L 63/04* (2013.01); *H04L 63/0823* (2013.01); *H04L 63/166* (2013.01); *H04L 67/1014* (2013.01); *H04L 67/62* (2022.05); *H04L 67/63* (2022.05); *H04L 61/5007* (2022.05); *H04L 61/5061* (2022.05)

(58) Field of Classification Search
USPC .......................................................... 705/64
See application file for complete search history.

(56) References Cited

U.S. PATENT DOCUMENTS

| | | | |
|---|---|---|---|
| 8,931,089 | B2 | 1/2015 | Kang |
| 9,417,897 | B1 | 8/2016 | Klompje et al. |
| 9,420,035 | B2 | 8/2016 | Evans et al. |
| 9,424,062 | B1 | 8/2016 | Mummidi et al. |
| 9,571,516 | B1 | 2/2017 | Curcic et al. |
| 9,851,989 | B2 | 12/2017 | Muller et al. |
| 9,860,117 | B2 | 1/2018 | Gan et al. |
| 9,870,271 | B1 | 1/2018 | Lappas et al. |
| 10,142,290 | B1 | 11/2018 | Brandwine et al. |
| 10,715,538 | B2 | 7/2020 | Torkelson et al. |
| 2004/0044772 | A1 | 3/2004 | Harkin |
| 2004/0088349 | A1 | 5/2004 | Beck et al. |
| 2004/0162076 | A1 | 8/2004 | Chowdry et al. |
| 2009/0241030 | A1 | 9/2009 | von Eicken et al. |
| 2009/0300607 | A1 | 12/2009 | Ferris et al. |
| 2010/0131948 | A1 | 5/2010 | Ferris |
| 2010/0180014 | A1 | 7/2010 | Kannan et al. |
| 2010/0242101 | A1 | 9/2010 | Reese, Jr. |
| 2010/0242105 | A1 | 9/2010 | Harris et al. |
| 2011/0113467 | A1 | 5/2011 | Agarwal et al. |
| 2011/0119382 | A1 | 5/2011 | Shaw, Jr. et al. |
| 2011/0131306 | A1 | 6/2011 | Ferris et al. |
| 2011/0296529 | A1* | 12/2011 | Bhanoo ............. H04L 63/04 726/26 |
| 2012/0124224 | A1 | 5/2012 | Raboin |
| 2012/0240182 | A1 | 9/2012 | Narayanaswamy et al. |
| 2013/0007845 | A1 | 1/2013 | Chang et al. |
| 2013/0055261 | A1 | 2/2013 | Han et al. |
| 2013/0073853 | A1 | 3/2013 | Ford |
| 2014/0019960 | A1 | 1/2014 | Jacklin et al. |
| 2014/0136681 | A1 | 5/2014 | Greenlee et al. |
| 2014/0365563 | A1 | 12/2014 | Raghu et al. |
| 2015/0085828 | A1 | 3/2015 | Chen |
| 2015/0113172 | A1 | 4/2015 | Johnson et al. |
| 2015/0212842 | A1 | 7/2015 | Ghosh et al. |
| 2015/0309831 | A1 | 10/2015 | Powers et al. |
| 2016/0197933 | A1 | 7/2016 | Lapidous et al. |
| 2016/0269355 | A1 | 9/2016 | Lee et al. |
| 2017/0118301 | A1 | 4/2017 | Kouru et al. |
| 2017/0134339 | A1 | 5/2017 | Bortnikov et al. |
| 2017/0331856 | A1* | 11/2017 | Vissamsetty ........ H04L 63/1416 |
| 2018/0103051 | A1 | 4/2018 | Torkelson et al. |
| 2018/0213002 | A1 | 7/2018 | Figovsky et al. |
| 2019/0098051 | A1* | 3/2019 | Carothers ........... G06F 9/45558 |
| 2019/0114630 | A1 | 4/2019 | Torkelson et al. |
| 2019/0158541 | A1 | 5/2019 | Miriyala et al. |
| 2019/0260788 | A1 | 8/2019 | Torkelson et al. |
| 2019/0278928 | A1 | 9/2019 | Rungta et al. |
| 2020/0244690 | A1 | 7/2020 | Torkelson et al. |

FOREIGN PATENT DOCUMENTS

| | | |
|---|---|---|
| WO | 2011119223 A1 | 9/2011 |
| WO | 2019067810 A1 | 4/2019 |

OTHER PUBLICATIONS

Kambhampati, V., et al., "Epiphany: A location hiding architecture for protecting critical services from DDoS attacks," IEEE/IFIP International Conference on Dependable Systems and Networks (DSN 2012), Boston, MA, 2012, pp. 1-12. (Year: 2012).

Pengpeng, W., et al., "Simulation of Dark Network Scene Based on the Big Data Environment," Proceedings of the International Conference on Information Technology and Electrical Engineering 2018, pp. 1-6 (Dec. 2018).

Non Final Rejection mailed Oct. 5, 2020 for U.S. Appl. No. 16/848,472 of Cary Torkelson, filed Apr. 14, 2020, 13 pages.

Supplementary European Search Report mailed Apr. 7, 2020 in European Patent Application No. 17858938.8, 10 pages.

Advisory Action mailed Jan. 3, 2020 for U.S. Appl. No. 15/720,932 of Cary Torkelson, filed Sep. 29, 2017, 4 pages.

Final Office Action mailed Oct. 24, 2019 in U.S. Appl. No. 15/720,932 of Cary Torkelson, filed on Sep. 29, 2017, 42 pages.

Final Rejection mailed Oct. 24, 2019 for U.S. Appl. No. 16/381,802 of Cary Torkelson, filed Apr. 11, 2019, 17 pages.

Notice of Allowance mailed Feb. 5, 2020 for U.S. Appl. No. 15/720,932 of Cary Torkelson, filed Sep. 29, 2017, 14 pages.

Non-Final Office Action mailed Jul. 18, 2019 in U.S. Appl. No. 16/381,802 of Cary Torkelson, filed on Apr. 11, 2019, 18 pages.

Advisory Action mailed Jan. 14, 2019 for U.S. Appl. No. 15/720,932 of Cary Torkelson, filed Sep. 29, 2017, 4 pages.

International Search Report and Written Opinion mailed Feb. 15, 2019, by the International Search Authority in International Patent Application No. PCT/US2018/053255, 11 pages.

Non-Final Office Action mailed Mar. 8, 2019 in U.S. Appl. No. 15/720,932 of Cary Torkelson, filed on Sep. 29, 2017, 19 pages.

\* cited by examiner

TRANSIENT TRANSACTION SERVER DNS STRATEGY

CROSS-REFERENCE TO RELATED APPLICATIONS

This application is a continuation of U.S. patent application Ser. No. 17/139,756, filed Dec. 31, 2020, which application is a continuation of U.S. patent application Ser. No. 16/142,559, filed Sep. 26, 2018, now abandoned, which application claims the benefit of U.S. Provisional Application No. 62/565,795, filed Sep. 29, 2017, the entire contents of which are incorporated herein by reference.

U.S. patent application Ser. No. 17/139,756 is a continuation-in-part of U.S. patent application Ser. No. 16/848,472, filed Apr. 14, 2020, now abandoned, which application is a continuation of U.S. patent application Ser. No. 15/720,932, filed Sep. 29, 2017, now U.S. Pat. No. 10,715,538, issued Jul. 14, 2020, which application claims the benefit of U.S. Provisional Application No. 62/503,562, filed May 9, 2017, and U.S. Provisional Application No. 62/403,587, filed Oct. 3, 2016, the entire contents of which are incorporated herein by reference.

BACKGROUND

Transactions performed by computer systems have a variety of security vulnerabilities. As transactions having increasing value are performed over the Internet and by computers accessible via the Internet, such transactions become increasingly vulnerable to attack.

What is needed, therefore, are improved techniques for protecting transactions, and the data accessed by such transactions, against attacks.

SUMMARY

A networked computer system enables a transaction to be executed securely. An initiator sends a service request to a control server. The control server creates a transaction server for the sole purpose of execution of the transaction requested by the service request. Creating the transaction server includes: selecting an IP address randomly from a pool of IP addresses and assigning the selected IP address to the transaction server; creating a DNS entry including a randomly-constructed hostname; and associating the DNS entry with the selected IP address. If the transaction server is pre-existing, it may be in an inaccessible state and then be made accessible in response to receiving the service request. The control server informs the initiator of the created transaction server. The initiator (and possibly one or more other authorized participants) engages in the transaction with the transaction server, independently of the control server. The transaction server terminates upon completion of the transaction or the expiration of a timeout period. The use of such a one-time transaction server increases security, privacy, and anonymity.

Other features and advantages of various aspects and embodiments of the present invention will become apparent from the following description and from the claims.

DETAILED DESCRIPTION

Embodiments of the present invention include systems and methods for provisioning a virtual server that is used to process a finite number of (e.g., one) transactions, after which the server is de-provisioned. Such systems and methods have a variety of advantages, such as the ability to better secure transactions from outside interference, and to allow more anonymity and privacy for such transactions and the data they access.

Figure 1:
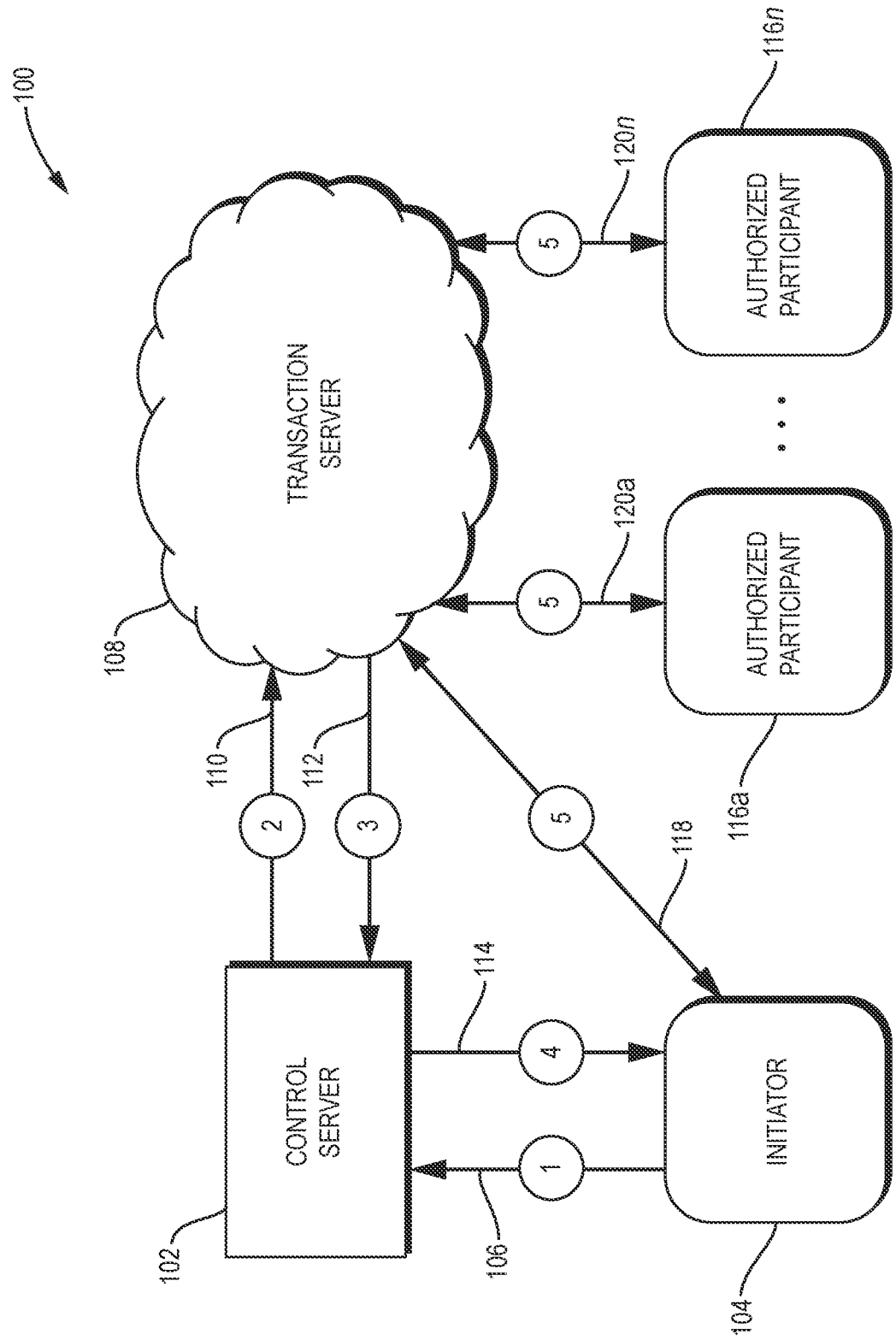
FIG. 1 is a dataflow diagram of a system for using a transient server to execute one or more transactions according to one embodiment of the present invention.
Figure 2:
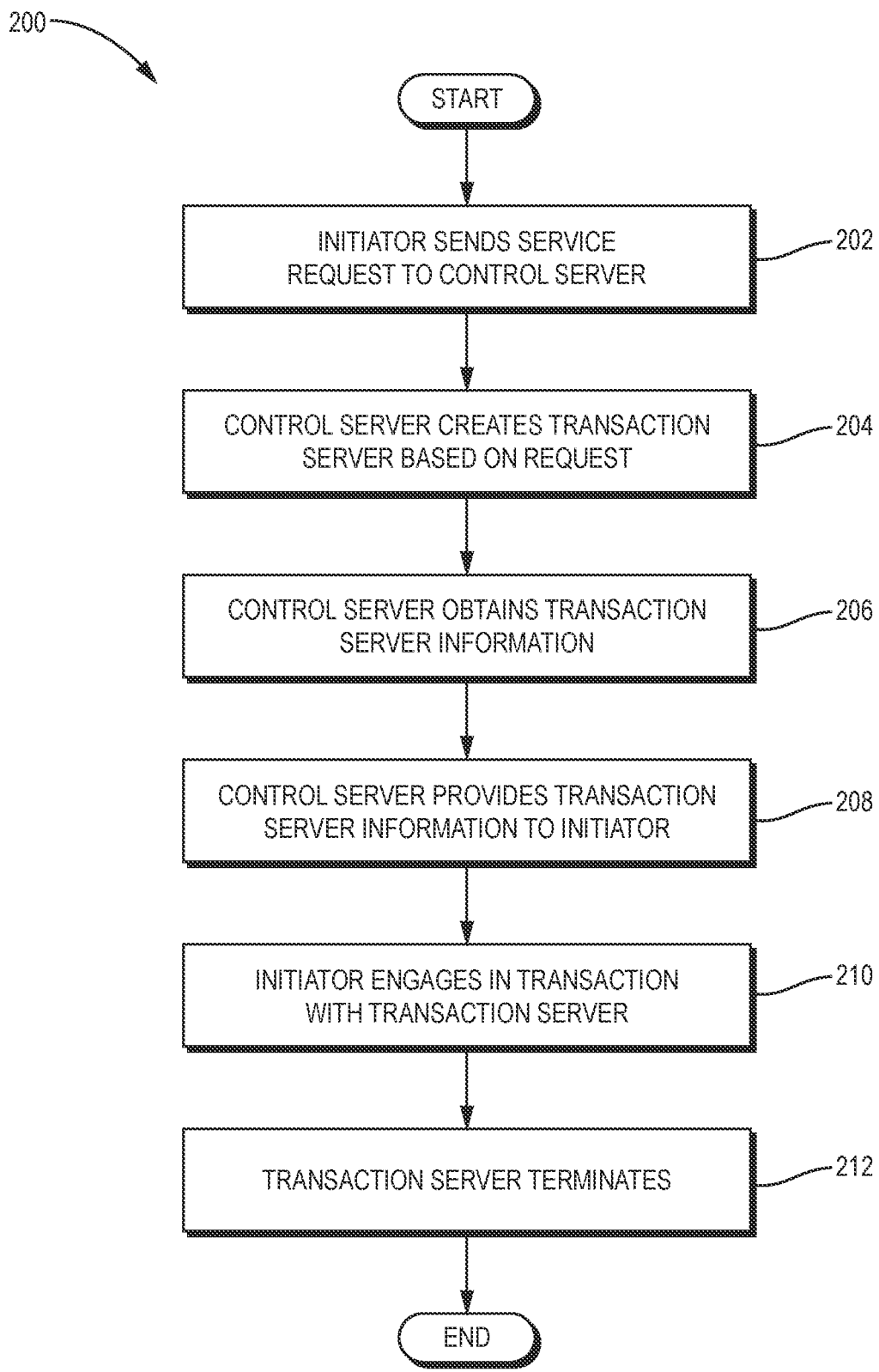
FIG. 2 is a flowchart of a method performed by the system of FIG. 1 according to one embodiment of the present invention.

For example, referring to FIG. 1, a dataflow diagram is shown of a system 100 for executing transactions according to one embodiment of the present invention. Referring to FIG. 2, a flowchart is shown of a method 200 performed by the system 100 of FIG. 1 according to one embodiment of the present invention.

The system 100 includes a control server 102. The control server 102 is a "computer system," as that term is used herein. The term "computer system" refers herein to any one or more computers acting in coordination with each other to execute instructions to perform operations on input and/or stored data to produce output. A computer system, such as the control server 102 may, for example, consist of a single computer of any kind (e.g., server, desktop PC, laptop PC, smartphone, tablet computer, PDA) or any combination of any number of computers of any kind(s). A computer system and/or any of its component computers may be a physical machine or a virtual machine. A computer system may, therefore, include any one or more physical machines and/or any one or more virtual machines in any combination, in any location relative to each other, including configurations in which two or more machines are either local to each other or accessible to each other remotely over a network. The component computers in a computer system may communicate with each other via any mechanism(s), such as one or more wires, buses, cables, wired network connections, wireless network connections, application program interfaces (APIs), or any combination thereof.

Although the computer system 102 is referred to herein as a "server," the control server 102 need not operate according to a client-server architecture. The term "server" is used herein to refer to the control server 102, and to other servers disclosed herein, merely for convenience and to indicate that the control server 102 responds to requests to provide services. The term "server," as used herein, refers to any kind of computer system, whether or not that computer system operates according to a client-server architecture. Therefore, the control server 102, and other servers disclosed herein, need not be a "server" as that term is used conventionally, but more generally may be any kind of computer system.

The system 100 also includes an initiator 104. The initiator 104 may, but need not be, a computer system. The initiator 104 provides a request 106 for a transaction to the control server 102, and the control server 102 receives the request 106 (FIG. 2, operation 202). The terms "transaction" and "service" are used interchangeably herein. The terms "service request" and "transaction request" are used herein to refer to requests to perform a service/transaction.

The control server 102 may have an address to which communications, such as the request 106, may be addressed. The control server 102's address may, for example, be a public Internet Protocol (IP) address and/or port, although this is not a limitation of the present invention. As another example, the control server 102's address may be an address that is behind a corporate or other private firewall. The control server 102 may or may not require and engage in secure communications. For example, the request 106 and other communications engaged in by the control server 102 may be secure communications. As another example, the control server 102 may limit its connections to only well-known initiators, or have other security measures in place to authenticate the initiator 104 and other initiators, such as hardware key devices and/or biometrics.

The initiator 104 may, but need not be, the end user or machine that intends to engage in the transaction requested by the request 106. For example, a proxy (not shown) may initiate the transaction, which may cause the initiator 104 to provide the request 106 to the control server 102.

The initiator 104 may provide (e.g., transmit) the request 106 to the control server 102 by addressing the request 106 to the control server 102's address (e.g., IP address and/or port), in response to which the system 100 may deliver the request 106 to the control server 102 at the control server 102's address. The initiator 104 may provide the request 106 to the control server 102 in any of a variety of ways and using any of a variety of mechanisms, such as by providing (e.g., transmitting) the request 106 via one or more wires, buses, cables, wired network connections, wireless network connections, application program interfaces (APIs), or any combination thereof. The same applies equally to any other communication disclosed herein.

In general, the request 106 contains data indicating a request to perform a particular transaction. Such data may, for example, indicate any one or more of the following in any combination: the type of transaction to be performed, one or more parameters of the transaction, and one or more values of each such parameter. The request 106 may request any type of transaction, such as any type of Software as a Service (SaaS) transaction. Examples of such transactions include, but are not limited to, digital asset exchange services, health care record services, secure messaging services, and industrial internet of things software/firmware update services.

The request 106 may, for example, include data representing any one or more of the following properties:

Transaction Type. This is the type of transaction requested by the request 106. The type of transaction determines what kind of transaction server 108 should be created. Examples include transfer of digital assets, secure message delivery, software distribution, and data manipulation and analysis.

Timeout. The timeout specifies how long, at most, the transaction server 108 should remain in existence. Typically, the transaction server 108 will self-terminate after the transaction is complete, but if for some reason the transaction does not complete within the timeout period, the transaction server 108 will terminate prior to the transaction being complete.

Transaction Specific Properties. Certain transaction types may have additional properties that are relevant to the transaction being processed, and need to be specified prior to the transaction server 108 being created. Examples include the maximum allowed message size for transfer and the maximum allowed amount of currency for exchange. These parameters apply immediately before any authorized participant communicates with the transaction server.

Privacy. Other transaction properties may be private, or may only be delivered directly to the transaction server 108, bypassing the control server 102. Example of these properties include maximum number of downloads for a file and a password needed for a secondary participant to enter the transaction.

Authorized Participants. A list of authorized participants can be specified at service request time. If so, only those participants are allowed to communicate with the transaction server 108 for participation in the transaction. Authorized participants may be specified by machine IP address, user name and password, or other ways by which a participant may contact the transaction server 108 (browser type, device type, etc.).

Authentication Method. This determines how entities authenticate with the transaction server 108. Examples of authentication methods include that no authentication is needed (public service), machine address authentication (e.g., IP address), software authentication (user/password pair), two-factor authentication, confirming a code or token, using an authorized browser extension, biometric authentication, or a combination of the above.

Privacy Level/Logging. Since the transaction server 108 self-terminates after the transaction is complete, no record of the transaction is stored permanently. It may be that the initiator 104 would like a record of the transaction to persist. If so, the transaction server 108 may send, to the control server 102 or another server (not shown), information to create a permanent record of the transaction server 108 and/or the transaction, such as copying log files to a persistent storage location and/or taking a snapshot of the transaction server 108 (or a portion thereof) as it existed before it was terminated.

In the example of FIG. 1, a single control server 102 is shown. Such a control server 102 may, for example, be general purpose, meaning that it may be capable of processing many (e.g., any) type of request 106. As another example, the control server 102 may be special purpose, meaning that it may be capable of processing only one or a finite set of request types. In the latter case, the system 100 may include a plurality of control servers 102, each of which may be capable of processing one or more types of requests.

The system 100 also includes a transaction server 108. The transaction server 108 may not exist (e.g., may not have been provisioned) before the initiator 104 provides the request 106 to the control server 102. Instead, the control server 102, in response to receiving the request 106, may create 110 (e.g., provision) the transaction server 108 (FIG. 2, operation 204). The control server 102 may, for example, create 110 the transaction server 108 based on contents of the request 106. For example, the control server 102 may generate the transaction server 108 to be capable of executing the type of transaction indicated by the request 106. Additionally or alternatively, the request 106 may include data representing one or more properties of a server that is required and/or desired to perform the requested transaction, in which case the control server 102 may create the transaction server 108 to have the properties represented by the request 106. Additionally or alternatively, the control server 102 may have access to a number of pre-defined transaction server images, from which the control server 102 may create the transaction server 108. Different transaction server images may, for example, be used to execute different types of transactions (e.g., one transaction server image to execute transactions of a first type and another transaction server image to execute transactions of a second type), or to execute the same type of transaction but with different properties as specified in the transaction request 106.

Element 110 in FIG. 1 represents the creation of the transaction server 108 by the control server 102. Such creation may be performed in any of a variety of ways. For example, the control server 102 may provide (e.g., transmit) a creation request to a cloud service provider (not shown) specifying that the transaction server 108 be provisioned to handle request 106. The transaction server 108 may, for example, be created using an industry standard machine image that was previously constructed to handle the type of SaaS request represented by the request 106 (such as may be identified using information in the request 106 which indicates the type of the request 106). Such a machine image may, for example, contain all of the software required to execute the transaction requested by the request 106, including all necessary customizations and configurations. Any transaction-specific parameters, such as the participants in the transaction, the types of data and/or assets being exchanged by the transaction, the agreed-upon exchange rates in the transaction, and others, may be specified either by a control file made available to the transaction server 108 at startup, or in the process of creating the transaction server 108.

The transaction server 108 is an example of a "computer system," as that term is used herein. The transaction server 108 may, for example, be a physical or virtual server (e.g., a computer system that is accessible over the Internet via a public IP address), or may include more than one virtual or cloud server. The transaction server 108 may include on-demand resources for assisting the transaction server 108 in executing the transaction requested by the request 106, such as private databases, high-speed disk caches, and/or third-party services and/or software.

The control server 102 identifies 112 (e.g., receives) an address at which the transaction server 108 is accessible (FIG. 2, operation 206). The control server 102 may, for example, receive the address of the transaction server 108 in a message transmitted by the transaction server 108 to the control server 102. As another example, the control server 102 may generate the address of the transaction server 108 and assign the generated address to the transaction server 108. The transaction server 108 may also indicate to the control server 102 (such as by transmitting an appropriate message to the control server 102) that the transaction server 108 is ready to execute the transaction requested by the initiator 104 in the request 106. Therefore, in general, element 112 in FIG. 1 indicates that, after creation of the transaction server 108, the transaction server 108 provides, to the control server 102, all information that the initiator 104 and/or authorized participants 116a-n will need to connect to and communicate with the transaction server 108.

The control server 102 provides 114 the address of the transaction server 108 to the initiator 104, such as by transmitting a message containing the address of the transaction server 108 to the initiator 104 (FIG. 2, operation 208). Such a message may be transmitted over a digital communication network, such as the Internet. This message may, for example, be transmitted in response to the request 106 from the initiator 104. More generally, element 114 in FIG. 1 indicates that the control server 102 indicates to the initiator 104 that the transaction server 108 is ready to execute the transaction requested by the request 106 and provides the initiator 104 with all information necessary for the initiator 104 to communicate with the transaction server 108, such as the transaction server 108's address.

As briefly mentioned above, the system 100 may also include, in addition to the initiator 104, one or more participants 116a-n who are authorized to participate in the transaction requested by the request 106. Note that n may be any number, such as 0, 1, 2, or higher. If n=0, then the initiator 104 is the only participant in the transaction requested by the request 106. If n=1, then only the initiator 104 and the authorized participant 116a participate in the transaction requested by the request 106, and the system 100 would not include authorized participant 116n. In certain embodiments of the present invention, the initiator 104 participates in the creation of the transaction server 108, but does not participate in transactions executed by the transaction server 108. In such embodiments, the authorized participant(s) 116a-n participate in the transaction(s) executed by the transaction server 108, while the initiator 104 does not participate in such transactions.

The control server 102 may, in certain embodiments, notify the authorized participants 116a-n about the transaction server 108, such as in the same way that the control server 102 notifies the initiator 104 about the transaction server 108. Alternatively, for example, the initiator 104 may inform the authorized participants 116a-n about the transaction server 108 after the control server 102 notifies the initiator 104 about the transaction server 108.

Once the transaction server 108 has been created and the initiator 104 (and possibly the authorized participants 116a-n) have been informed about the transaction server 108, the initiator 104 may engage 118 in the transaction requested by the request 106 with the transaction server 108 (FIG. 2, operation 210). The initiator 104 may provide (e.g., transmit) information to the transaction server 108 by addressing the transaction server 108 using the address received 114 by the initiator 104 from the control server 102. The same is true of communications, if any, between the authorized participants 116a-n and the transaction server 108.

If the authorized participants 116a-n are to participate in the transaction, then the authorized participants 116a-n may also engage 120a-n in the transaction requested by the request 106 with the transaction server 108. In general, elements 118 and 120*a-n* in FIG. 1 represent all interactions between and among the initiator 104, authorized participants 116*a-n*, and the transaction server 108 that are involved in the execution of the transaction by the transaction server 108. Such interactions may include transmitting and receiving messages (e.g., from the transaction server 108 to the initiator 104 and/or other participants, or from the initiator and/or other participants to the transaction server 108) over a network (such as the Internet), where such messages may include commands and/or data.

At some point after the completion of the execution of the transaction by the transaction server 108, the transaction server 108 terminates (e.g., is de-provisioned or otherwise deleted, destroyed, or inactivated) (FIG. 2, operation 212). For example, the transaction server 108 may terminate immediately upon completion of the transaction or otherwise in response to completion of the transaction, or after (and in response to) the expiration of some predetermined timeout period after initiation of the transaction, even if the transaction does not complete. These server termination criteria are merely examples and are not limitations of the present invention. The transaction server 108 may terminate in response to any one or more server termination criteria being satisfied, such as terminating in response to:

- completion of some predetermined number of transactions by the transaction server 108;
- determining that a transaction being executed by the transaction server 108 satisfies an anomalous condition or otherwise is aberrant in some way (e.g., has one or more parameter values which fall outside permissible ranges of values);
- determining that at least some predetermined number of participants have participated in a transaction with the transaction server 108;
- satisfaction of any binary criterion in relation to a transaction executed by the transaction server 108;
- determining that a transaction executed by the transaction server 108 (or the transaction server 108 as a whole) has transferred at least some predetermined amount of data; and
- determining that a transaction executed by the transaction server 108 (or the transaction server as a whole) has transferred at least some predetermined amount of files.

As just described, in certain embodiments, the transaction server 108 may execute at most one (e.g., exactly one) transaction before terminating. In other embodiments of the present invention, the transaction server 108 executes a finite number of transactions, greater than one, before terminating, or executes any number of transactions for no more than some predetermined finite amount of time (referred to herein as the timeout period), before terminating. As another example, the transaction server 108 may terminate after executing a transaction having a specified property (possibly after having executed one or more additional transactions). More generally, the system 100 may apply one or more terminating criteria to the transaction server 108. The system 100, in response to determining that the termination criteria have been satisfied, may terminate the transaction server 108. The particular examples of termination criteria explicitly disclosed herein (e.g., maximum number of transactions, maximum amount of time, transaction type) are merely examples and are not limitations of the present invention.

As the description above implies, the control server 102 is involved in the creation of the transaction server 108, but does not otherwise participate in the execution of the transaction by the transaction server 108. For example, the control server 102 may not send or receive any information (e.g., commands and/or data) to or from the transaction server 108 other than that required to create the transaction server 108 and to obtain information about the creation and availability of the transaction server 108, as indicated by elements 110, 112, and 114 in FIG. 1. In some embodiments of the present invention, the control server 102 does not send or receive information to or from the transaction server 108 in the process of creating the transaction server 108, in which case the control server 102 does not send or receive any information to or from the transaction server 108 at any point.

In particular, after the transaction server 108 has been created, the transaction server 108 executes the transaction requested by the request 106 without the involvement of the control server 102. For example, the transaction server 108 engages in all communication 118 and 120*a-n* with the initiator 104 and authorized participants 116*a-n* without the involvement of the control server 102. As another example, the transaction server 108 terminates without the involvement of the control server 102. As another example, no commands or data involved in the transaction, such as critical, private, or sensitive data, may pass through the control server 102.

The control server 102 may or may not be involved in the termination of the transaction server 108. For example, the control server 102 may cause the transaction server 108 to terminate, such as by sending a termination instruction to the transaction server 108 or through another mechanism. Alternatively, for example, the transaction server 108 may terminate itself, without the involvement of the control server 102.

As mentioned above, the control server 102 and the transaction server 108 each have at least one address (e.g., IP address) at which they are addressable. The control server 102's address is distinct and different from the transaction server 108's address. For example, the control server 102 may have one IP address and the transaction server 108 may have another IP address that is different from the control server 102's IP address. As another example, the control server 102 and the transaction server 108 may be accessible at different ports of the same IP address. The control server 102 may be a physical machine and the transaction server 108 may be another physical machine that is distinct from the control server 102. As yet another example, the control server 102 and transaction server 108 may be different virtual machines residing on the same physical computer system.

One advantage of embodiments of the present invention, such as the system 100 of FIG. 1 and the method 200 of FIG. 2, is that they enable the transaction requested by the request 106 to be performed more securely than in prior art systems. Creating and using the transaction server 108 solely for a finite number of transactions (e.g., one transaction), and executing the transaction independently of the control server 102, protects against the risk that a successful attack on that transaction will also compromise other transactions and the data accessible to such transactions, because any attack on the transaction execution by the transaction server 108 has no access to other transactions or to the data accessible to such transactions. Embodiments of the present invention, therefore, include improved computer systems and methods which address a previously-unsolved technical problem in computer security, namely the technical problem of how to protect servers against being compromised by attacks on other servers. This problem, and its solution by embodiments of the present invention, are inherently rooted in computer technology, represent an improvement to computer technology, and use particular combinations of non-conventional computer technology to produce previously unrealized technical benefits.

One advantage of embodiments of the present invention illustrated in FIGS. 3-8 is that they enable transactions to executed by computers more quickly and efficiently than in prior art systems by provisioning transaction servers before they are needed, thereby enabling such transaction servers to be available for use without the delay that would be incurred if such transaction servers were not provisioned until they were needed. The embodiments illustrated in FIGS. 3-8, therefore, solve the technical problem of how to enable virtual servers to execute transactions more efficiently, and do so using a solution which is inherently rooted in computer technology, which is an improvement to computer technology, and which uses particular combinations of non-conventional computer technology to produce previously unrealized technical benefits.

As described above, in some embodiments of the present invention, the transaction server 108 may not exist (e.g., be provisioned) before the control server 102 receives the request 106. In other embodiments of the present invention, however, the transaction server 108 may exist before the control server receives the request 106. In such embodiments, however, the transaction server 108 may be inaccessible, at least to any component of the system 100 other than the control server 102, before the request 106 is received. The transaction server 108 may even be inaccessible to any component of the system 100, including the control server 102, before the request 106 is received. As will be described in more detail below, in such embodiments, in response to receiving the request 106, the control server 102 may make the transaction server 108 accessible (e.g., to the initiator 104 and/or the authorized participants 116a-n), so that the transaction server 108 becomes available to execute one or more transactions in any of the ways described above.

Figure 3:
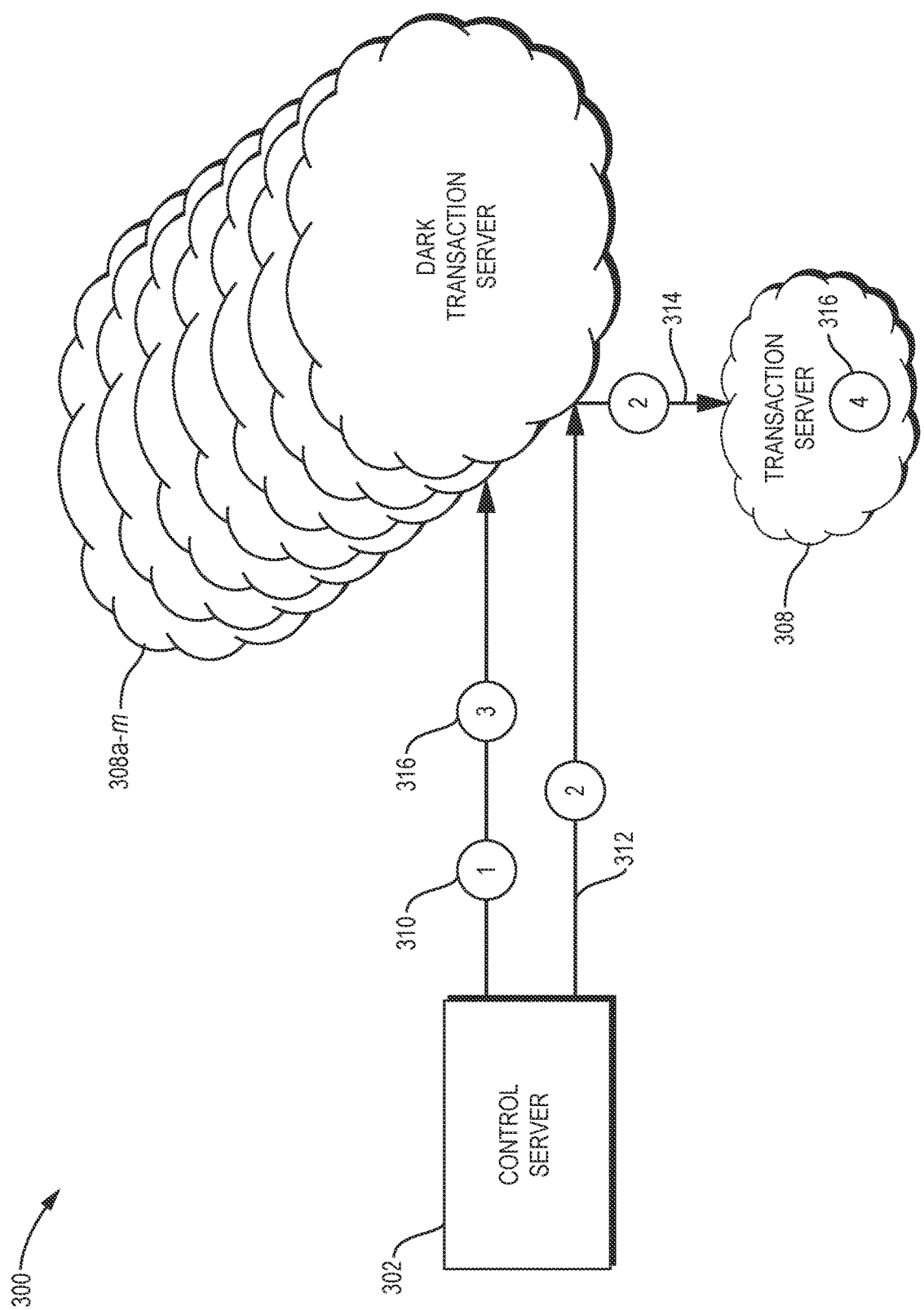
FIG. 3 is a dataflow diagram of a system for making an existing but unaddressable transaction server addressable in order to execute one or more transactions according to one embodiment of the present invention.
Figure 4:
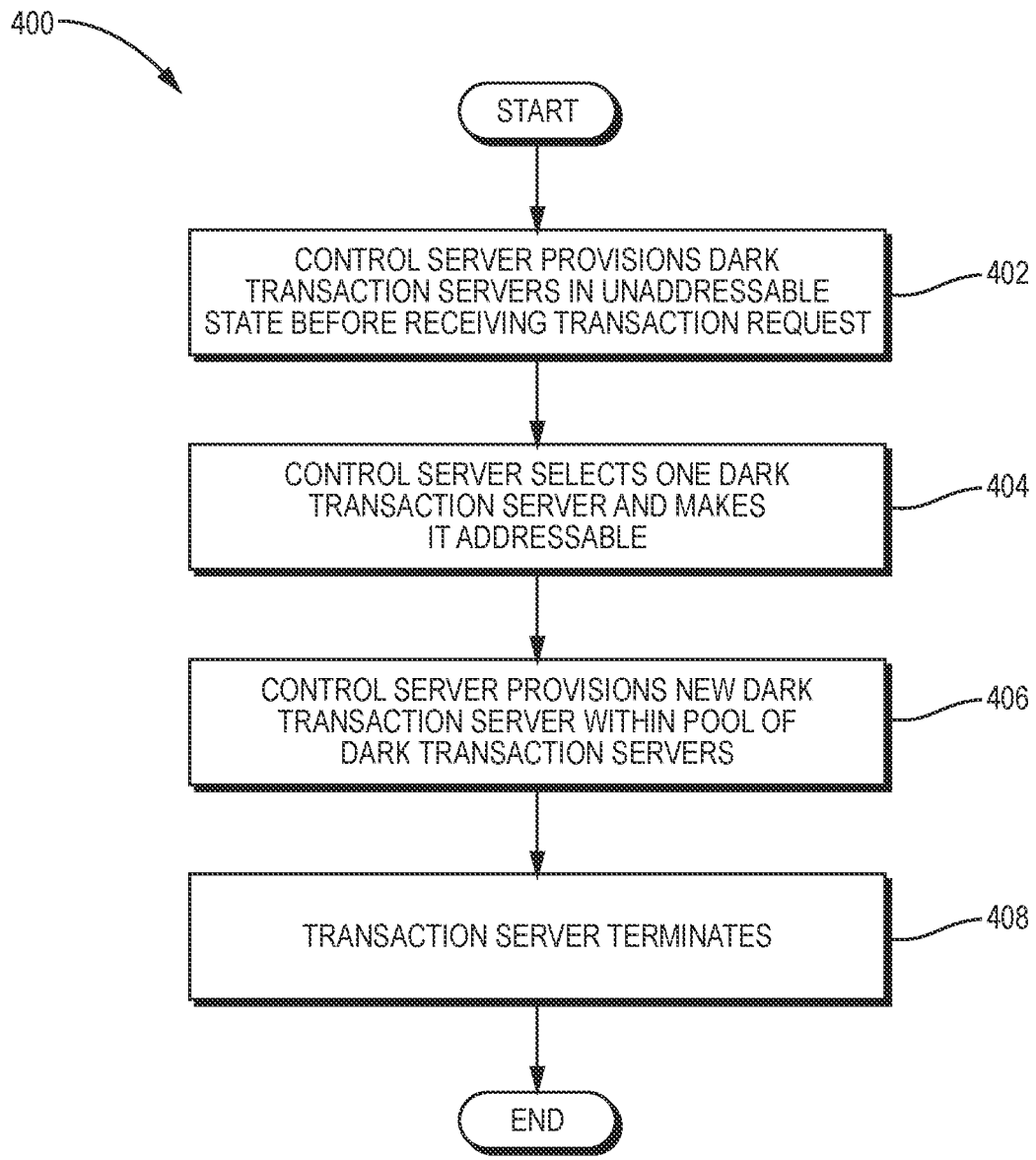
FIG. 4 is a flowchart of a method performed by the system of FIG. 3 according to one embodiment of the present invention.

More specifically, referring to FIG. 3, a dataflow diagram is shown of a system 300, including one or more "dark" transaction servers 308a-m, for making one of the dark transaction servers 308a-m accessible for use as a transaction server 308. Referring to FIG. 4, a flowchart is shown of a method 400 performed by the system 300 of FIG. 3 according to one embodiment of the present invention. Although the description herein shows a plurality of dark transaction servers 308a-m and the description refers herein to the plurality of dark transaction servers 308a-m, all such references should be understood to refer to any number of transaction servers, including as few as one transaction server.

The system 300 of FIG. 3 may perform some or all of the functions of the system 100 of FIG. 1. For ease of illustration and explanation, only the aspects of the system 300 of FIG. 3 that differ from the system 100 of FIG. 1 are described herein. The absence of a description herein of aspects of the system 100 of FIG. 1 in connection with the system 300 of FIG. 3 does not imply that the system 300 of FIG. 3 does not also have those aspects. The same is true of the method 400 of FIG. 4 relative to the method 200 of FIG. 2.

The control server 302 may provision 310 one or more transaction servers 308a-m (referred to herein as "dark" transaction servers), even before the initiator 104 provides the request 106 to the control server 302 (FIG. 4, operation 402). One reason why it may be beneficial to provision the dark transaction servers 308a-m before the control server 302 receives the request 106 is that there may be a noticeable delay between the time at which the control server 302 receives the request 106 and the time at which a transaction server (e.g., the transaction server 108 in FIG. 1) may be provisioned and become fully available to execute transactions. Such delays may be undesirable and it may be beneficial to mitigate or eliminate such delays when using a transaction server to execute time-sensitive transactions. Delays of five seconds or more are undesirable in many environments, and in some situations such delays may be as long as two or three minutes, or even longer. As described in more detail below, embodiments of the present invention may be used to mitigate or eliminate such delays while maintaining the security benefits of the transient nature of the transaction server 108.

The control server 302 provisions the dark transaction servers 308a-m in a manner that makes the dark transaction servers 308a-m unaddressable. This unaddressibility is what makes the dark transaction servers 308a-m "dark." The control server 302 may make the dark transaction servers 308a-m unaddressable immediately upon provisioning them, such that the dark transaction servers 308a-m are not addressable unless and until they are subsequently made addressable, such as in any of the ways described below.

The control server 302 may make the dark transaction servers 308a-m unaddressable in any of a variety of ways. For example, the control server 302 may configure one or more security policies of a server provider that provides the dark transaction servers 308a-m to make the dark transaction servers 308a-m unaddressable.

Even while the dark transaction servers are unaddressable, they may still be capable of making outgoing requests. While a server is unaddressable, it may poll the control server 302 to determine whether the control server 302 has received a transaction request that has not yet been assigned to a transaction server. As described in more detail below, the control server 302 may assign transaction requests to dark transaction servers and provide transaction parameters and other information to the dark transaction servers when they are needed to service transaction requests.

In general, regardless of the particular mechanism that the control server 302 uses to make the dark transaction servers 308a-m unaddressable, the effect of such unaddressability is to prohibit elements of the system 300 (such as the initiator 104, the authorized participants 116a-n, and even the control server 302 itself) from seeing the dark transaction servers 308a-m on the network and from sending network traffic to or receiving network traffic from the dark transaction servers 308a-m. As a result, such elements of the system 300 cannot alter the configurations of the dark transaction servers 308a-m or alter the predetermined behaviors of the dark transaction servers 308a-m while the dark transaction servers are in their unaddressable (dark) state.

Now assume that the control server 302 receives the transaction request 106, as shown and described above in connection with FIGS. 1 and 2. In response to receiving the request 106, the control server 302 selects 312 one of the dark transaction servers 308a-m and makes 314 the selected dark transaction server addressable over the network (FIG. 4, operation 404). The resulting addressable (non-dark) transaction server is shown as transaction server 308 in FIG. 3.

The control server 302 may make the transaction server 308 addressable in any of a variety of ways, such as by updating the server provider's security policy to allow network traffic to be sent to and from the transaction server 308. Such updates may specify particular entities (e.g., the initiator 104 and/or authorized participants 116a-n) who are authorized to communicate with the transaction server 308, so that only those entities, and no other entities, can communicate with the transaction server 308. As a result, elements of the system 300, such as the initiator 104, the authorized participants 116*a-n*, and the control server 302 itself, may see the transaction server 308 on the network and may send network traffic to and receive network traffic from the transaction server 308 while the transaction server 308 is in its addressable (non-dark) state. The effect of provisioning the transaction server 308 in an unaddressable state before the control server 302 receives the request 106, and then making the transaction server 308 addressable in response to receiving the request 106, is similar, from a security perspective, to provisioning the transaction server 308 in response to receiving the request 106, because the transaction server 308 is not accessible and therefore cannot be tampered with before the request 106 is received, but results in making the transaction server 308 accessible to transaction participants (e.g., the initiator 104 and/or authorized participants 116*a-n*) more quickly than if the transaction server 308 were not provisioned until after the request 106 is received, by eliminating the time required to provision the transaction server 308 after receiving the request 106.

The control server 302 may provision 316 a new dark transaction server and include the newly provisioned server within the pool of dark transaction servers 308*a-m* (FIG. 4, operation 406). The control server 302 may provision the new dark transaction server in any of the ways disclosed above in connection with the provisioning 310 of the dark transaction servers 308*a-m* (FIG. 4, operation 402). The newly provisioned server is then available for selection as a transaction server the next time operation 404 of method 400 is performed.

At a subsequent time, the transaction server 308 terminates 316 (FIG. 4, operation 408). The transaction server 308 may terminate, for example, in any of a variety of ways, such as any of the ways disclosed herein in connection with termination of the transaction server 108 of FIG. 1 (FIG. 2, operation 212), such as by terminating the transaction server 308 in response to the transaction server 308 completing its transaction or in response to a timeout period elapsing before the transaction server 308 has completed its transaction. The control server 302 may provision the new dark transaction server in response to any of a variety of conditions being satisfied, including complex conditions. For example, the control server 302 may let the existing transaction server 308 operate during business hours and terminate the existing transaction server 308 after it has operated in standby mode for two hours during off-hours.

The control server 302 may provision a new dark transaction server within the pool of dark transaction servers 308*a-m* in response to terminating the transaction server 308, in any of the ways disclosed herein. The newly provisioned server is then available for selection as a transaction server the next time operation 404 of method 400 is performed.

Terminating the transaction server 308 in operation 408 is only one possibility and is not a limitation of the present invention. Alternatively, for example, instead of terminating the transaction server 308, the transaction server 308 may be put back into an unaddressable state (using any of the techniques disclosed herein), and thereby again become part of the pool of dark transaction servers 308*a-m*, where it would again become available for selection to perform one or more additional transactions. Although the resulting dark transaction server would not be pristine, because it would already have performed a transaction, it would again be in an unaddressable state, thereby preventing any outside entity from affecting its function. Such an embodiment would reduce the overall cost of operating the system 300 compared to embodiments in which transaction servers are terminated, and would provide high-volume transaction systems with the ability to handle such high volumes without needing to provision and terminate servers at a rapid rate.

Certain embodiments of the present invention may maintain both a pool of dark transaction servers (such as the pool of dark transaction servers 308*a-m* shown in FIG. 3) and a pool of IP addresses. Such an embodiment is illustrated by the system 500 of FIG. 5, and the corresponding method 600 of FIG. 6.

Figure 5:
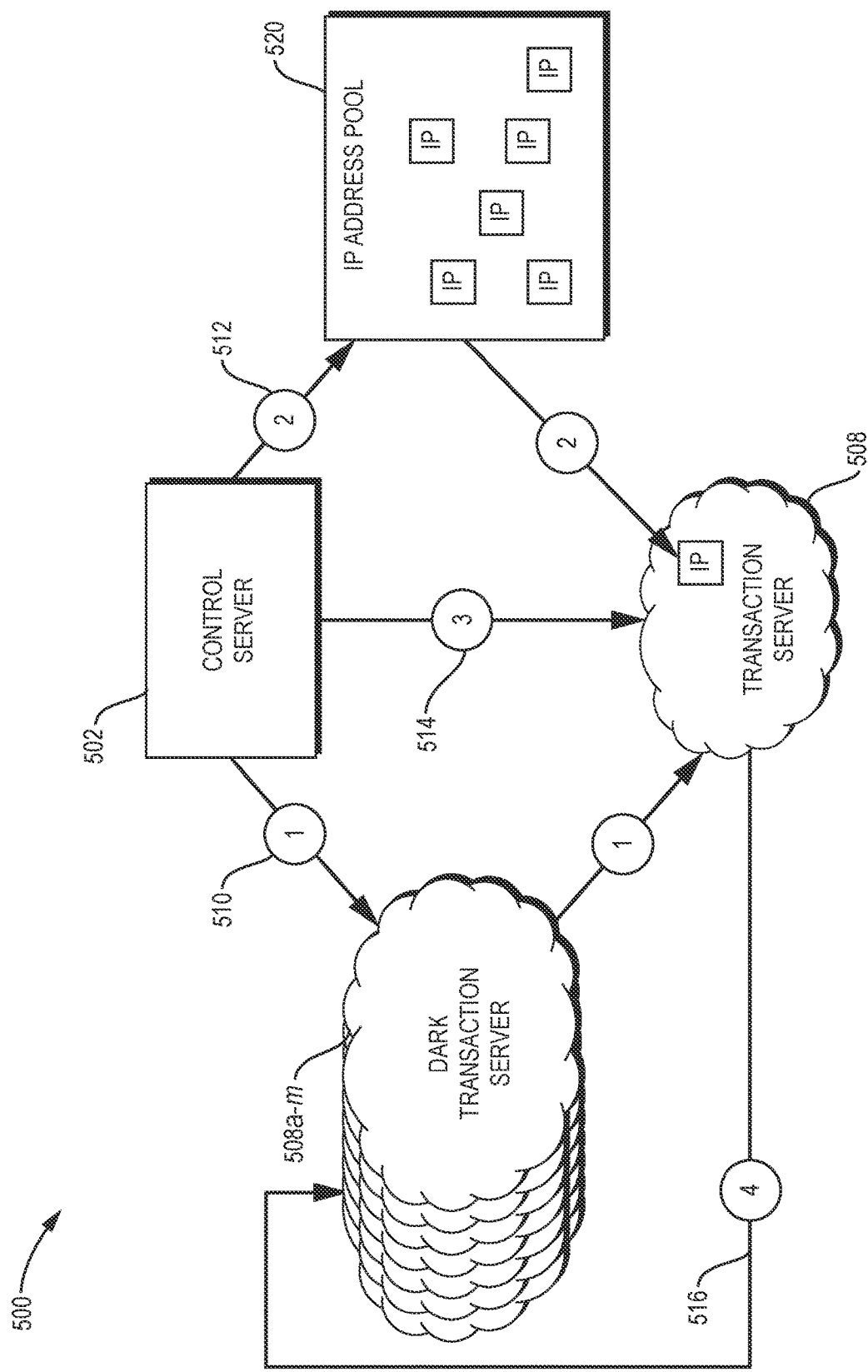
FIG. 5 is a dataflow diagram of a system for using a pool of IP addresses to change the IP addresses of transaction servers over time according to one embodiment of the present invention.

The system 500 of FIG. 5 includes a control server 502, which may be the same as or similar to the control server 302 of FIG. 3. The system 500 of FIG. 5 also includes a pool of dark transaction servers 508*a-m*, which may be the same as or similar to the pool of dark transaction servers 308*a-m* of FIG. 3. For ease of illustration and explanation, only the aspects of the system 500 of FIG. 5 that differ from the system 300 of FIG. 3 are described herein. The absence of a description herein of aspects of the system 300 of FIG. 3 in connection with the system 500 of FIG. 5 does not imply that the system 500 of FIG. 5 does not also have those aspects. The same is true of the method 600 of FIG. 6 relative to the method 400 of FIG. 4.

Figure 6:
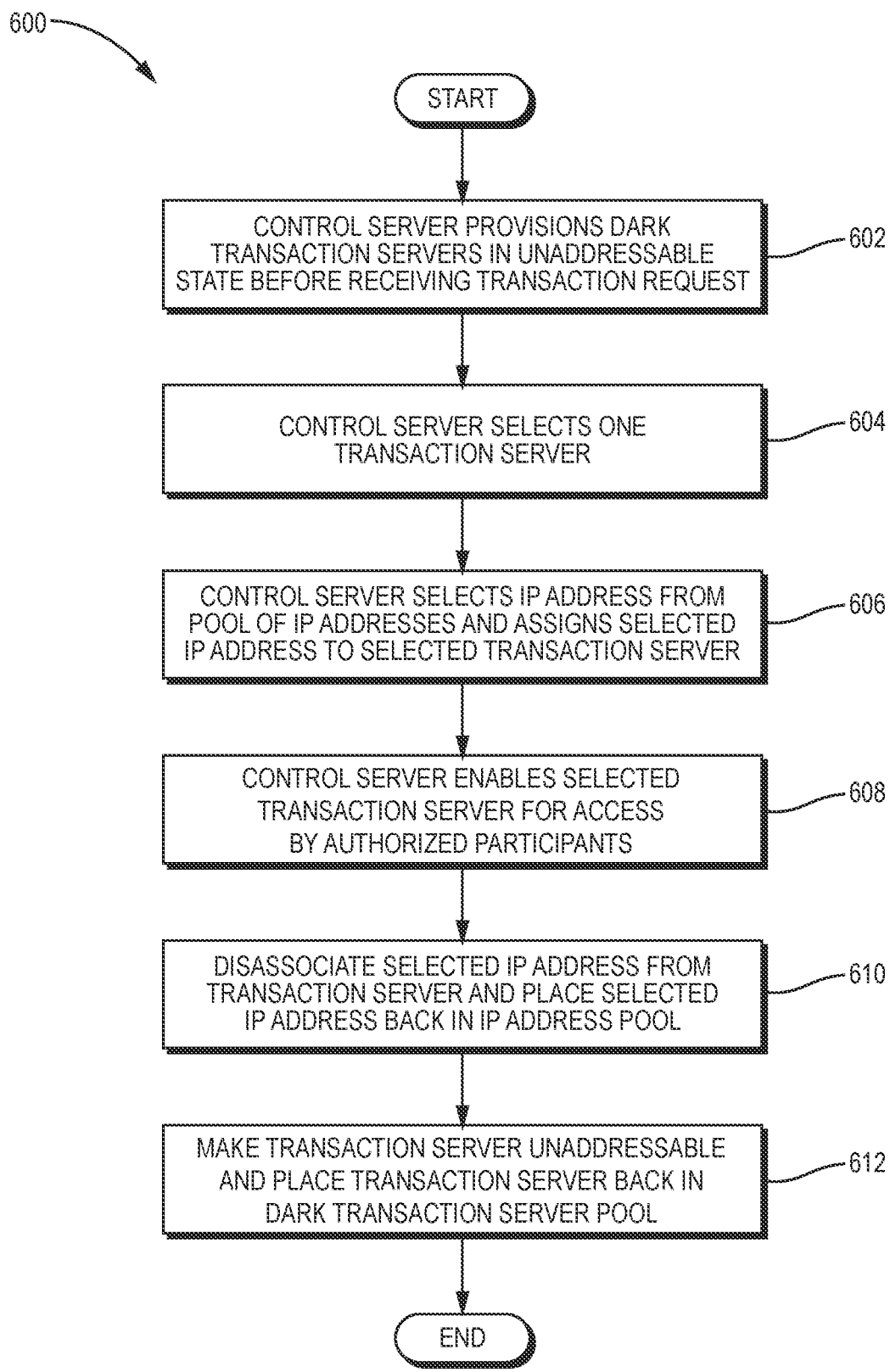
FIG. 6 is a flowchart of a method perform by the system of FIG. 5.

As in the system 300 of FIG. 3 and the method 400 of FIG. 4, in the system 500 of FIG. 5, the control server 502 may provision one or more of the transaction servers 508*a-m*, even before the initiator 104 provides the request 106 to the control server 502, using any of the techniques disclosed above (FIG. 6, operation 602). Similarly, as in the system 300 of FIG. 3 and the method 400 of FIG. 4, in the system 500 of FIG. 5, the control server 502 may receive the transaction request 106, as shown and described above in connection with FIGS. 1 and 2. In response to receiving the request 106, the control server 502 selects 510 one of the dark transaction servers 508*a-m* and makes 314 the selected dark transaction server addressable over the network (FIG. 6, operation 604). The resulting addressable (non-dark) transaction server is shown as transaction server 508 in FIG. 5.

The control server 502 also selects 512 (e.g., randomly) one of the IP addresses from a pool 520 of IP addresses in the system 500, assigns the selected IP address to the selected transaction server 508 (FIG. 6, operation 606). The selected IP address is then no longer available for selection or assignment to any other servers.

The control server 502 enables 514 the selected transaction server 508 to be addressable at the selected IP address, such as by updating the server provider's security policy to allow network traffic to be sent to and from the transaction server 508 at the selected IP address (FIG. 6, operation 608).

At a subsequent time (such as in response to the transaction server 508 completing its transaction or in response to the lapse of a timeout period without completion of the transaction by the transaction server 508), the control server 502 executes two actions 516: (1) disassociates the selected IP address from the transaction server 508 and may or may not make the selected IP address again available for selection from within the pool 520 of IP addresses (FIG. 6, operation 610); and (2) makes the transaction server 508 unaddressable and makes the transaction server 508 again available for selection for use from the pool of dark transaction servers 508*a-m* (FIG. 6, operation 612).

The system 500 of FIG. 5 and the method 600 of FIG. 6 make it possible for the transaction servers 508*a-m* to be used more than once (whether or not they actually are used more than once), thereby obtaining the benefit of reducing or eliminating the time required to provision new servers in response to each new transaction request, while randomizing the IP addresses that are assigned to transaction servers as they are brought into use, thereby reducing or eliminating the security risks introduced by reusing servers. Furthermore, regardless of the number of transactions performed by each of the transaction servers 508a-m before terminating, the system 500 of FIG. 5 and the method 600 of FIG. 6 have the benefit that they make a dark transaction server's IP address unknowable until it is activated for use in a transaction.

Figure 7:
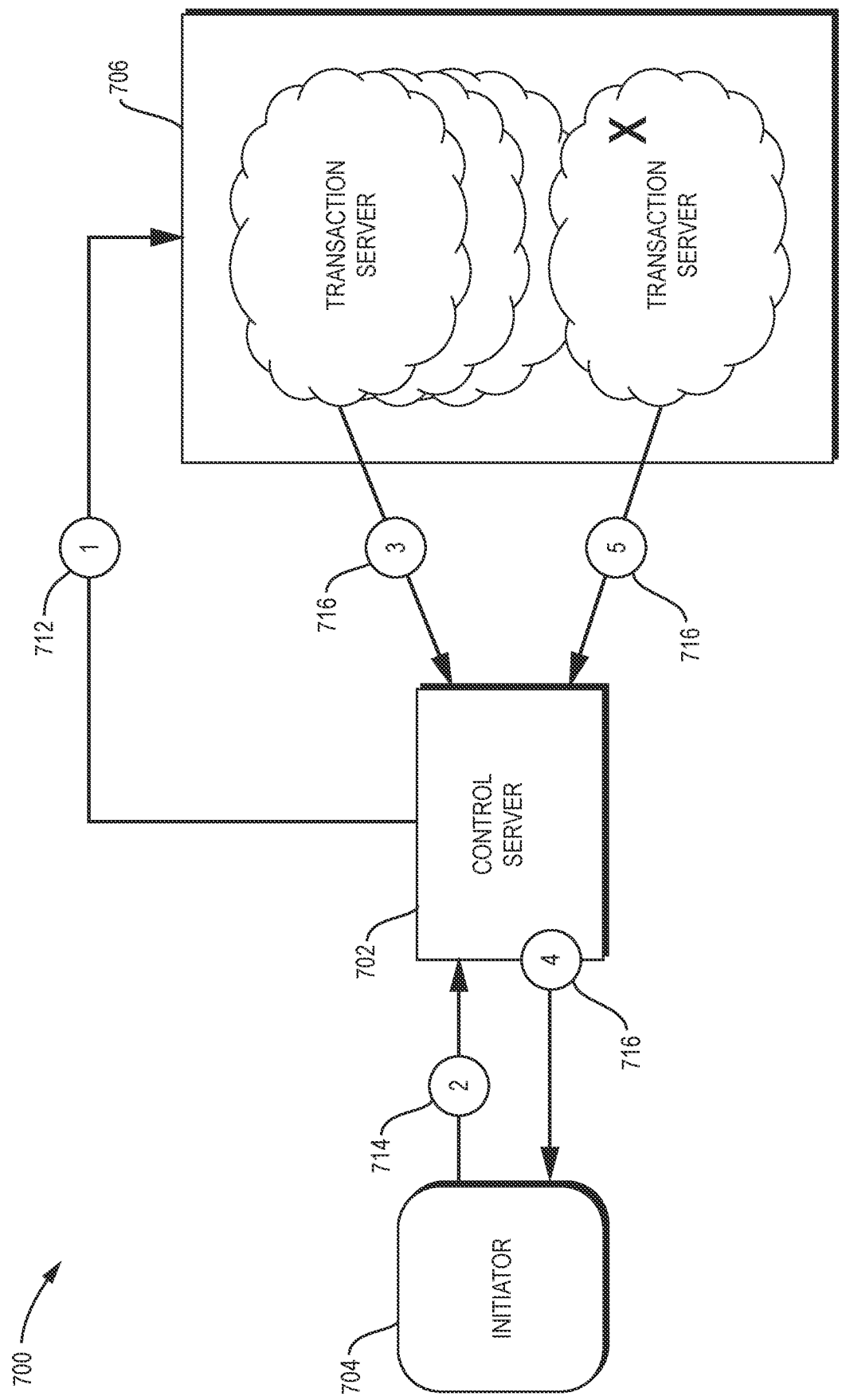
FIG. 7 is a dataflow diagram of a system for continuously provisioning transaction servers according to one embodiment of the present invention.
Figure 8:
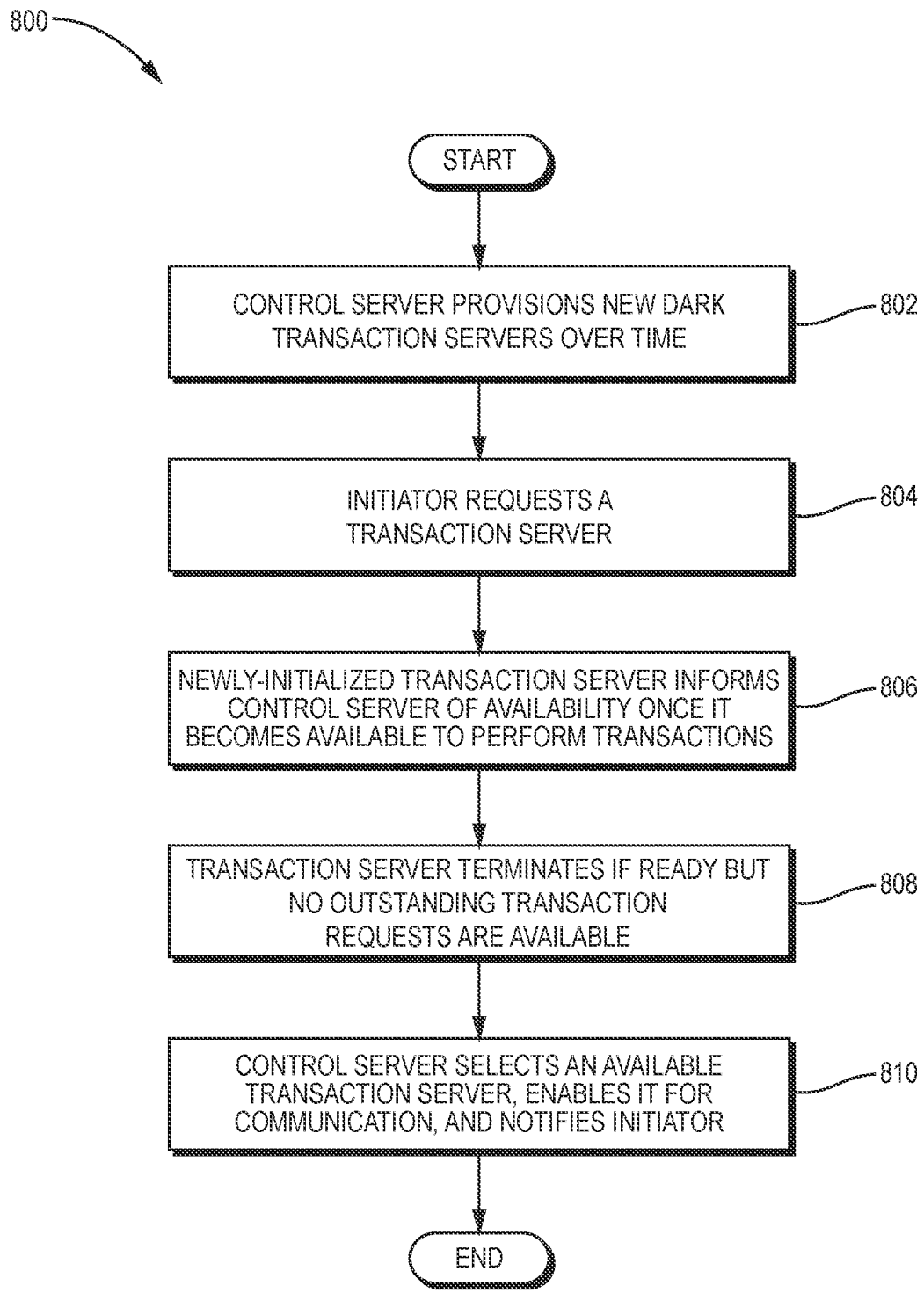
FIG. 8 is a flowchart of a method performed by the system of FIG. 7 according to one embodiment of the present invention.

Yet another embodiment of the present invention is illustrated by FIG. 7, which is a dataflow diagram 700 of a system for continuously provisioning transaction servers, and FIG. 8, which is a flowchart of a method 800 performed by the system 700 of FIG. 7 according to one embodiment of the present invention.

The control server 702 (which may be the same as or similar to any of the other control servers 102, 302, and 502 disclosed herein) repeatedly (e.g., periodically) provisions 712 new dark transaction servers in a pool 706 of dark transaction servers (FIG. 8, operation 802). The control server 702 may, for example, provision one dark transaction server and add it to the pool 706 of dark transaction servers at one time, and then, at a later time, provision another dark transaction server and add it to the pool 706 of dark transaction servers. The control server 702 may repeat this process for any amount of time and for any number of dark transaction servers. The control server 702 may provision each of the dark transaction servers in the pool 706 as "dark" (unaddressable) transaction servers in any of the ways disclosed herein.

An initiator 704 (which may be the same as or similar to the initiator 104 of FIG. 1) requests 714 a transaction server, such as in any of the ways disclosed above in connection with FIGS. 1 and 2 (FIG. 8, operation 804).

At any time, when a new dark transaction server in the transaction server pool 706 has finished initializing and is ready to perform a transaction, that transaction server informs 716 the control server 702 that the transaction server is ready to perform a transaction (FIG. 8, operation 806). Note that the newly-initiated transaction server may inform the control server 702 of its availability at any time, such as before and/or after the initiator 704 requests 714 a transaction server from the control server 702.

If, at the time the control server 702 is informed by the newly-initiated transaction server that the newly-initiated transaction server is available to perform a transaction, there are no pending transaction requests at the control server 702, then the transaction server terminates 716 (FIG. 8, operation 808). The control server 702 may, for example, determine that it does not have any pending transaction requests and, in response to such a determination, terminate the transaction server or instruct the transaction server to terminate.

In response to receiving the request 714, the control server 702: (1) selects dark transaction server, if any, that is available to perform transactions, which may include waiting for a dark transaction server to become available; (2) makes the selected transaction server addressable and otherwise enables the selected transaction server for communication; and (3) informs 716 the initiator 704 of the address of the selected transaction server (FIG. 8, operation 810). The initiator 704 and the selected transaction server (which is no longer "dark") may then communicate with each other, and the transaction server may perform one or more transactions on behalf of the initiator 704 in any of the ways disclosed herein.

By staggering the number of servers being provisioned continuously over time in the system 700 of FIG. 7, any delay between a service request 714 and the availability of a server for servicing that request can be eliminated, while maintaining the security benefits of the transient transaction servers disclosed herein.

Embodiments of the present invention disclosed herein may be combined with each other in various ways. For example, the system 100 and method of FIGS. 1 and 2, respectively, may be combined with the systems and methods of FIGS. 3-8 in various ways, as will be apparent to those having ordinary skill in the art.

Embodiments of the present invention may be used in a variety of applications, such as the following, which are merely illustrative and not exhaustive.

Push of Software Update or Patch from an Original Equipment Manufacturer (OEM). A transaction server 108 may be used by a smart machine OEM 104, or an authorized third party, to authenticate and transmit software updates to remote smart machines 116n.

Machines with microprocessors, programmable logic controls (PLCs), supervisory control and data acquisition (SCADA) systems and distributed control systems (DCS), that are connected to the internet, known as smart machines 116n, need periodic software updates. These smart machines often lack systems for secure communication or a system of authenticating the sender or software package, and they may receive unauthorized software updates from bad actors that seek to secure unauthorized control over the smart machine or install damaging software.

Embodiments of the present invention may be used to install a software update on the diaspora of their remote smart machines 116n. The OEM acts as an Initiator 108 to establish a transaction server 108 by sending request 106 to a Control Server 102 to cause the transaction server 108 to be created using specific parameters. In this case, the Transaction Server 108 parameters may be or include authentication information. The Transaction Server 108, once created, authenticates the OEM 104, and the software is transferred 118 from the OEM 104 to the transaction server 108. The authenticated software is then transmitted 120n from the transaction server 108 to the smart machines 116n.

Advantages of the software update/patch embodiment described above include the following: (1) protects against installation of malicious software; (2) scalable—unlimited numbers of transaction servers may be created; (3) unlimited smart machines may be updated from the single or multiple transactional servers; and (4) redundancy—transaction servers may be created with redundant updates to ensure updates communicate with intended devices on various platforms or in various environments or via various transmission methods.

Transmission of Health Records. Embodiments of the present invention may use a Transaction Server 108 to mitigate the likelihood and magnitude of risk of unauthorized access and transfer of digital health records from a generator 116a of the records to another authorized participant 116b. The Initiator 104 may be the medical group that generated the records, the patient, an insurance company or another medical facility that needs the records.

In this example, the Initiator 104 may be the insurance company for the insured that needs an insured patient's medical records, and the Authorized Participant 116a may be the medical group that generated the records. The insurance company (Initiator 104) contacts 106 a Control Server 102 to establish 110 a Transaction Server 108 with specified parameters. These parameters may be authentication, cybersecurity, and data record keeping and reporting requirements in accordance with insurance and HIPPA or other health regulatory and industry requirements. The Transaction Server 108 notifies (118 and 120*a*) the Initiator 104 and the medical group or Authorized Participant 116*a* that it has been created in accordance with the specified parameters, the medical group 116*a* transmits 120*a* the health records to the Transaction Server 108. The Transaction Server 108 then forwards 118 the health records to the insurance company 104. The Transaction Server 108 is then terminated 212. All communication and data transfer is protected with encryption keys.

Advantages of the transmission of health records embodiment described above include: (1) prevents a man-in-the-middle attack where a bad actor targets the records during transit; (2) eliminates direct repeated continuous communication links vulnerabilities; (3) establishes a foundation for big data storage in an encrypted format; and (4) significantly reduces risk by limiting the records available on the transaction server to only those needed for the specific transaction being executed.

Transient Asset Escrow and Exchange. A Transaction Server 108 may be used to securely exchange digital assets for trusts and banking companies, digital exchange operators, title companies, and securities exchanges, brokerages or clearing agencies.

As an illustrative example, a digital exchange operator, the Initiator 104, identifies two traders or Authorized Participants 116*a* and 116*b*, that wish to exchange digital assets (via trade order matching). The digital assets may be crypto currencies such as Bitcoin or Litecoin, digital fiat currency, digital deeds, or any other digital asset of value. It is not necessary for the digital exchange to take custody of either the digital assets or the asset's private cryptographic keys. The assets remain with the two owners until the trade order match is made and the transaction is ready to proceed.

When Authorized Participant 116*a* and Authorized Participant 116*b* are ready to exchange assets, the digital exchange operator or Initiator 104 communicates 118 to the Control Server 102, which creates 110 the Transaction Server 108 and escrow. The Transaction Server 108 confirms it is established according to Initiator's 104 specified parameters by communicating (112) appropriate messages to Control Server 102, Initiator 104 and the traders or Authorized Participants (116*a* and 116*b*). Each Authorized Participant (116*a* and 116*b*) send their assets to the escrow and Transaction Server 108. The Transaction Server 108 will confirm the details and authenticate the parties and the transaction according to the specified parameters. Once custody of the assets is confirmed on relevant blockchains for the specified period (of blocks, based on the level of transaction surety or the settlement risk specified by the Control Server 102), the Transaction Server 108 will transfer (120*a* and 120*b*) the assets to the respective recipients, Authorized Participants (116*a* and 116*b*). The Transaction Server 108 may or may not confirm that the intended recipients have received the new digital assets, according to the parameters. Once the transaction is complete, the Transaction Server 108 transmits the information that the Control Server 102 has specified in the parameters, and then terminates 212. The Transaction Server 108 may control one transaction or multiple transactions during its existence.

Advantages of the transient asset escrow and exchange embodiment described above include: (1) the system establishes a true escrow; (2) bad actors do not have enough time to locate, target and penetrate the Transaction Server, because the Transaction Server exists only for a brief period of time; (3) bad actors do not know the location or address of the server hosting the Transaction Server, because the Transaction Server is created on a random outside server; (4) because the exchange Operator does not have access to Parties' private keys, no assets are aggregated, and phishing the digital exchange Operator does not provide access to a pool of aggregated deposits, as it currently does in exchange Operator systems; and (5) reduces reserve currency requirements and cyber security costs for digital exchange operator.

As described above, the IP address of the transaction server 108 may be assigned randomly to increase security. If, however, the transaction server 108 acts as a web server and thereby hosts a web site or other application that is accessed via a web browser on a computer of the initiator 104 (or other transaction participant), then randomly assigning an IP address to the transaction server 108 can result in a variety of problems. Certain embodiments of the present invention address and solve these problems.

For example, the use of a dynamically and randomly assigned IP address for the transaction server 108 prevents the computer of the initiator 104 (or other transaction participants) from communicating with the transaction server 108 using Secure Sockets Layer (SSL) communications. (Any references herein to the initiator 104 should be understood to be equally applicable to any transaction participant(s) other than the initiator 140). Embodiments of the present invention solve this problem and enable the initiator 104 to communicate with the transaction server 108 using SSL communications even if the transaction server 108 has a dynamically and randomly assigned IP address.

More specifically, the problem occurs when the web browser of the initiator 104 (or the web browser of any transaction participant) attempts to authenticate the identity of the web site hosted by the transaction server 108. In this situation, the web browser attempts to verify the SSL certificate presented to the web browser by the transaction server 108, in order to prevent spoofing or other illicit activity that would render the secure HTTP connection vulnerable. Such verification requires that the transaction server 108 have a Domain Name Server (DNS) entry that matches the domain on the SSL certificate installed on the transaction server 108.

The term "web browser" or "browser" as used herein refers to any client application that is capable of communicating via HTTPS/SSL technology. The term "web server" as used herein refers to any application that is capable of using HTTPS/SSL technology to communicate with clients.

Several problems may arise in the attempt to perform such verification within the systems and methods described above and shown in FIGS. 1-8, such as:

Web browsers and other HTTP clients often need to address servers using a hostname, rather than merely using the IP address that has been assigned to the transaction server 108. A web browser of a transaction participant (e.g., the initiator 104) must be able to look up such a name using a trusted DNS server, which then resolves the name to the IP address of the transaction server 108.

Due to propagation delays and caching, DNS entry changes cannot be immediately or reliably distributed world-wide. As a result, a transaction participant's web browser is not guaranteed to pick up such DNS entry changes when the web browser is directed to the transaction server 108, which has a randomly-assigned IP address and/or DNS entry.

Figure 9:
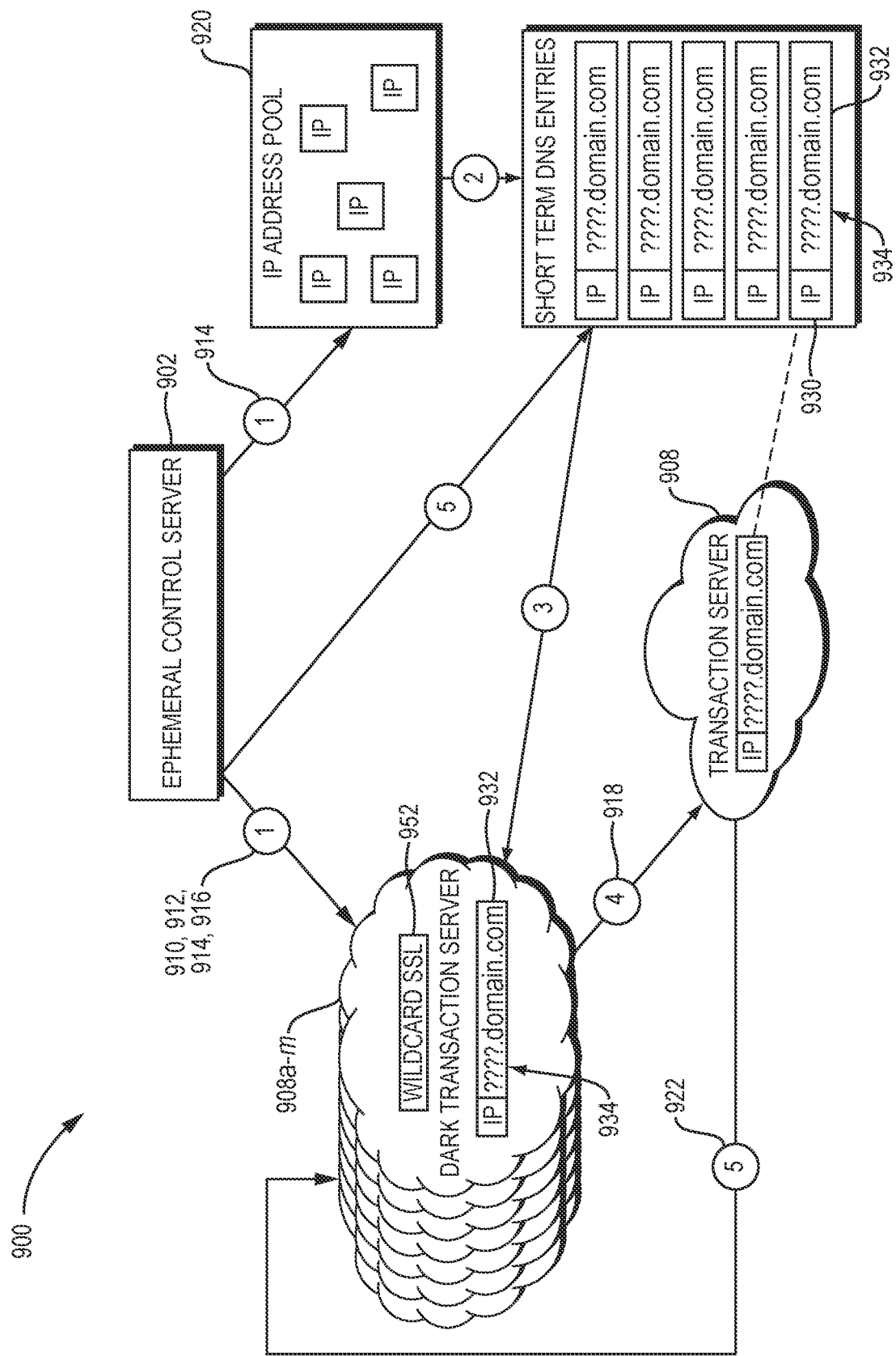
FIG. 9 is a dataflow diagram of a system for employing a DNS strategy in connection with transaction servers having randomly-assigned IP addresses according to one embodiment of the present invention.
Figure 10:
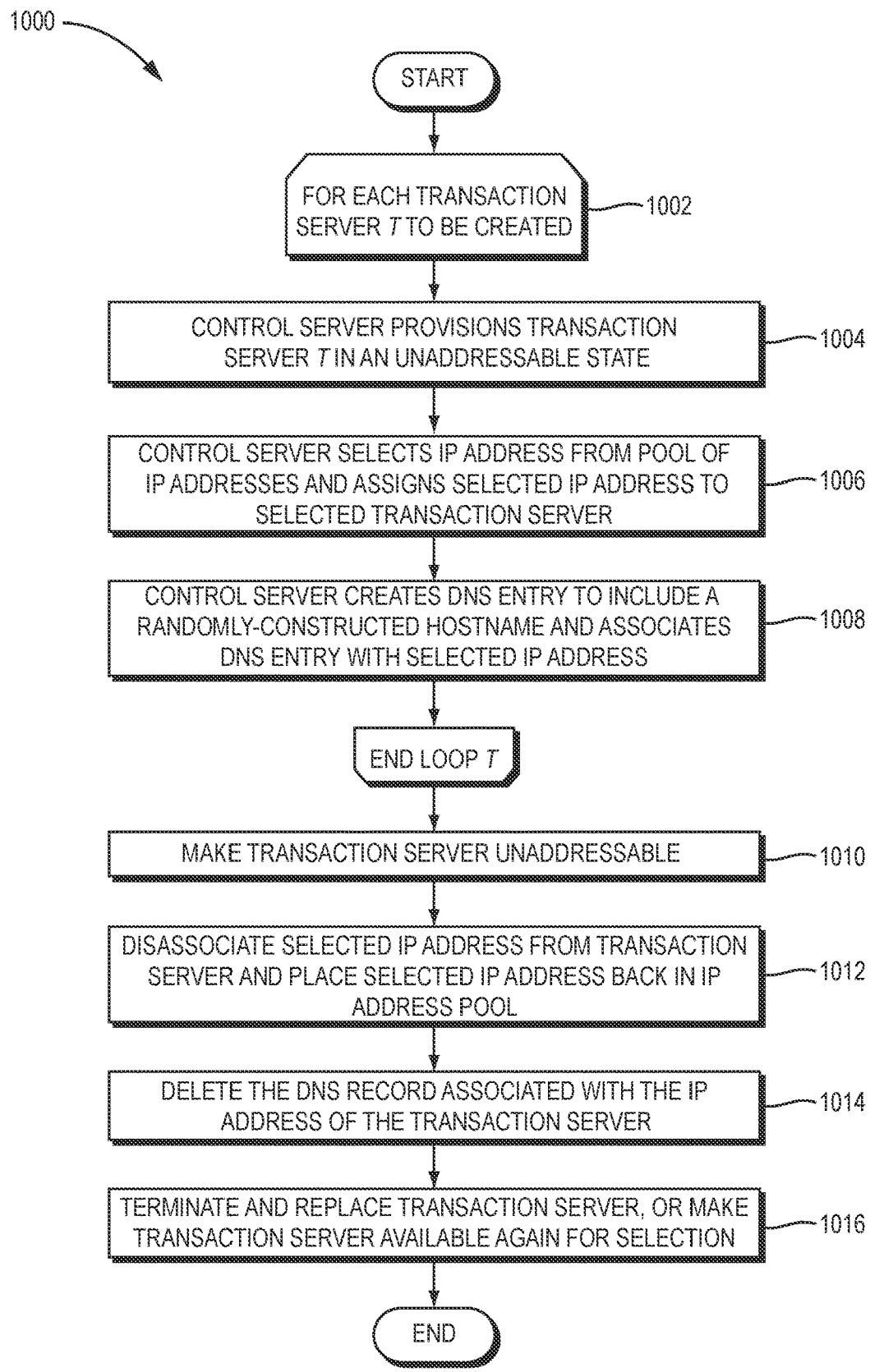
FIG. 10 is a flowchart of a method performed by the system of FIG. 9 according to one embodiment of the present invention.

Embodiments of the present invention described below address and solve these and other problems resulting from the dynamic and random assignment of IP addresses and DNS entries to the transaction server 108. Referring to FIG. 9, a dataflow diagram is shown of a system 900 implementing a DNS strategy in connection with the transaction server 108 according to one embodiment of the present invention. Referring to FIG. 10, a flowchart is shown of a method 1000 performed by the system of FIG. 9 according to one embodiment of the present invention.

The system 900 includes a control server 902, which may perform any of the functions of the control server 102 described above. The system 900 also includes a transaction server 908, which may perform any of the functions of the transaction server 108 described above.

In addition, the control server 902 in the system 900 of FIG. 9 provisions one or more transaction servers 908a-m by entering a loop in operation 1002 and, for each transaction server T:

- The control server 902 provisions 910 transaction server T in an unaddressable state, optionally with a wildcard SSL certificate 952 installed on it, such as in the way disclosed above in connection with operation 602 in FIG. 6 (FIG. 10, operation 1004). As described above, the transaction server T may not allow any inbound traffic from any source (even the control server 902) at this point. The use of the wildcard SSL certificate 952 is merely one example of a mechanism for implementing certain features of embodiments of the present invention, and is not a requirement of all embodiments of the present invention. For example, an alternative would be to dynamically create SSL certificates matching the randomly created DNS entries for each server, then install the corresponding certificate on the transaction server when it is created. The end result would be that any web client connecting to the transaction server recognizes and trusts the SSL certificate presented by that transaction server.
- The control server 902 randomly selects 914 one of the IP addresses from a pool 920 of IP addresses in the system 900, such as by using an API call to obtain an elastic IP address in an Amazon Web Services (AWS) environment (or other similar provider), and assigns the randomly-selected IP address 930 to transaction server T (FIG. 10, operation 1006).
- The control server 902 creates 916 a new DNS entry 934 (such as an A record) in a set of short-term DNS entries 940 on a DNS server (not shown) by randomly constructing a hostname 932 and associating the hostname 932 with the IP address 930 selected in operation 1008 (FIG. 10, operation 1008). The association between the hostname 932 and the IP address 930 may be implemented by, for example, storing both the hostname 932 and the IP address 930 in the same DNS record 934. Note that the hostname 932 may include both the randomly-constructed portion and one or more pre-existing and non-randomly constructed portions. For example, the randomly-constructed portion of the hostname 932 may appear to the left of the pre-existing and non-randomly constructed domain name. As a particular example, operation 1010 may involve constructing the hostname XXXX.domain.com, where: (1) domain.com is not randomly constructed and matches the wildcard certificate (*.domain.com), and where (2) XXXX (which may contain any number of characters) represents the randomly-constructed portion of the hostname. In certain embodiments of the present invention, for enhanced security, DNS hostnames are not reused, in case an unauthorized person obtains the hostname, and for DNS resolution/propagation reasons. In other words, all of the DNS hostnames created in the loop of operations 1002-1008 in FIG. 9 may be unique. Changes to DNS records require unpredictable amounts of time to propagate. An SSL certificate matching XXXX.domain.com may be used as an alternative to the wildcard SSL certificate described herein.

The DNS entries 940 created in operation 1008 may, for example, be created on standard domain name servers that distribute DNS information on the public network such that any client can resolve. Examples of these domain name servers include GoDaddy, Amazon Route 53, and Google Cloud DNS. Private domain name servers connected to the public network may also be used. The result is that existing common and standard DNS protocols are followed such that no specialized procedures or software is needed to allow web-based clients to access transaction servers assigned the IP address in operation 1006.

When a request is received by the control server 902 from an initiator to perform a transaction (such as from an initiator in any of the ways described above), the control server 902 may select 918 one of the unaddressable transaction servers 908a-m, make the selected transaction server 908 addressable, and enable inbound traffic to the selected transaction server 908 from the initiator (and any other transaction participants), such as an any of the ways described above (FIG. 10, operation 1012). In addition, operation 1014 may include the control server 902 informing the initiator of the DNS name 932 of the selected transaction server 908.

If the DNS entry 934 for the selected transaction server 908 has not been propagated to the client of the initiator and/or any other authorized participant, the client will cause a lookup to occur, which will allow the client to correctly resolve the hostname 932 to the IP address 930 associated with that hostname 932 and selected transaction server 908. Note that the time-to-life (TTL) parameter for the A record is not necessarily important here, because the hostname 932/IP address 930/DNS entry 934 is meant only for temporary usage, and to be used with only one transaction server (namely, the selected transaction server 908), and therefore will not change over time.

Although not shown in FIG. 9 or 10, the selected transaction server 908 may perform one or more transactions, such as in any of the ways disclosed above. The use of the transaction server 908 to perform one or more transactions is omitted from FIGS. 9 and 10 merely to avoid redundant description herein.

As described above (e.g., in connection with FIGS. 5 and 6), the transaction server 908 may be terminated, such as upon completion of a transaction executed by the transaction server 908, upon the expiration of a timeout period, or upon the satisfaction of any other server termination criteria. Regardless of the event that triggers the termination of the transaction server 908, when the transaction server 908 terminates, the control server 902 may perform one or more of the following actions:

- disallow all inbound network traffic to the transaction server 908, thereby making the transaction server 908 unaddressable (FIG. 10, operation 1010);
- disassociate the IP address 940 from the transaction server 908 and return the IP address 940 to the IP address pool 920 (FIG. 10, operation 1012);

delete the DNS record 944 associated with the IP address 940 (FIG. 10, operation 1014); and terminate the transaction server 908 and create a new transaction server to replace it in the pool of transaction servers 908*a-m*, or return 922 the transaction server 908 to the pool of transaction servers 908*a-m* and provide the transaction server 908 with a new randomly-selected IP address and hostname combination (FIG. 10, operation 1016).

It is to be understood that although the invention has been described above in terms of particular embodiments, the foregoing embodiments are provided as illustrative only, and do not limit or define the scope of the invention. Various other embodiments, including but not limited to the following, are also within the scope of the claims. For example, elements and components described herein may be further divided into additional components or joined together to form fewer components for performing the same functions.

Any of the functions disclosed herein may be implemented using means for performing those functions. Such means include, but are not limited to, any of the components disclosed herein, such as the computer-related components described below.

The techniques described above may be implemented, for example, in hardware, one or more computer programs tangibly stored on one or more computer-readable media, firmware, or any combination thereof. The techniques described above may be implemented in one or more computer programs executing on (or executable by) a programmable computer including any combination of any number of the following: a processor, a storage medium readable and/or writable by the processor (including, for example, volatile and non-volatile memory and/or storage elements), an input device, and an output device. Program code may be applied to input entered using the input device to perform the functions described and to generate output using the output device.

Embodiments of the present invention include features which are only possible and/or feasible to implement with the use of one or more computers, computer processors, and/or other elements of a computer system. Such features are either impossible or impractical to implement mentally and/or manually. For example, embodiments of the present invention include computer systems which include a variety of components, such as the control server 102 and transaction server 108, which are themselves computer systems, and which communicate with each other over digital communication networks, such as the Internet. Embodiments of the present invention, therefore, are directed to improvements to computer technology.

Any claims herein which affirmatively require a computer, a processor, a memory, or similar computer-related elements, are intended to require such elements, and should not be interpreted as if such elements are not present in or required by such claims. Such claims are not intended, and should not be interpreted, to cover methods and/or systems which lack the recited computer-related elements. For example, any method claim herein which recites that the claimed method is performed by a computer, a processor, a memory, and/or similar computer-related element, is intended to, and should only be interpreted to, encompass methods which are performed by the recited computer-related element(s). Such a method claim should not be interpreted, for example, to encompass a method that is performed mentally or by hand (e.g., using pencil and paper). Similarly, any product claim herein which recites that the claimed product includes a computer, a processor, a memory, and/or similar computer-related element, is intended to, and should only be interpreted to, encompass products which include the recited computer-related element(s). Such a product claim should not be interpreted, for example, to encompass a product that does not include the recited computer-related element(s).

Each computer program within the scope of the claims below may be implemented in any programming language, such as assembly language, machine language, a high-level procedural programming language, or an object-oriented programming language. The programming language may, for example, be a compiled or interpreted programming language.

Each such computer program may be implemented in a computer program product tangibly embodied in a machine-readable storage device for execution by a computer processor. Method steps of the invention may be performed by one or more computer processors executing a program tangibly embodied on a computer-readable medium to perform functions of the invention by operating on input and generating output. Suitable processors include, by way of example, both general and special purpose microprocessors. Generally, the processor receives (reads) instructions and data from a memory (such as a read-only memory and/or a random access memory) and writes (stores) instructions and data to the memory. Storage devices suitable for tangibly embodying computer program instructions and data include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A computer can generally also receive (read) programs and data from, and write (store) programs and data to, a non-transitory computer-readable storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium.

Any data disclosed herein may be implemented, for example, in one or more data structures tangibly stored on a non-transitory computer-readable medium. Embodiments of the invention may store such data in such data structure(s) and read such data from such data structure(s).

The invention claimed is:

1. A method of enabling a secure transaction to be performed by a user across a network, the method comprising:

selecting, in response to a request for performing the secure transaction, a virtual server for the secure transaction, wherein the virtual server is configured to perform secure transactions, and the virtual server is unaddressable over the network at the time of selecting the virtual server such that the user cannot transmit network traffic to the virtual server; and after selecting the virtual server for the secure transaction, updating at least one security policy of the virtual server to make the virtual server addressable to the user over the network by an IP address assigned to the virtual server, and transmitting the IP address of the selected virtual server to the user.

2. The method of claim 1, wherein the IP address of the virtual server is different from an IP address of a control computer that performs the selecting, updating, and transmitting steps.

3. The method of claim 1, wherein the virtual server is selected from a pool of virtual servers that have been created but that are unaddressable over the network at the time of selecting the virtual server.

4. The method of claim 1, further comprising:
before receiving the request for performing the secure transaction, creating the virtual server in an unaddressable state.

5. The method of claim 1, wherein the request for performing the secure transaction specifies a type of the secure transaction, and the method further comprises:
identifying a property associated with the specified type, the identified property being applied to the virtual server before the virtual server executes the secure transaction for the user, and wherein the server is configured to execute transactions of the specified type.

6. The method of claim 5,
wherein the specified type is one of: transfer of digital assets, secure message delivery, software distribution, and data manipulation and analysis,
wherein when the specified type is transfer of digital assets, the identified property is a maximum allowed amount of a currency for exchange, and
wherein when the specified type is secure message delivery, the identified property is a maximum allowed size of a message.

7. The method of claim 1, further comprising:
after transmitting the IP address of the virtual server to the user, determining that a virtual server termination criterion has been satisfied; and
in response to determining that the virtual server termination criterion has been satisfied, terminating the virtual server.

8. A non-transitory computer-readable medium comprising instructions that are executable in a computer system, wherein the instructions when executed cause the computer system to carry out a method of enabling a secure transaction to be performed by a user across a network, and the method comprises:
selecting, in response to a request for performing the secure transaction, a virtual server for the secure transaction, the virtual server being configured to perform secure transactions, and the virtual server being unaddressable over the network at the time of selecting the virtual server such that the user cannot transmit network traffic to the virtual server; and
after selecting the virtual server for the secure transaction, updating at least one security policy of the virtual server to make the virtual server addressable to the user over the network by an IP address assigned to the virtual server and transmitting the IP address of the selected virtual server to the user.

9. The non-transitory computer-readable medium of claim 8, wherein the IP address of the virtual server is different from an IP address of a control computer of the computer system that performs the selecting, updating, and transmitting steps.

10. The non-transitory computer-readable medium of claim 8, wherein the virtual server is selected from a pool of virtual servers that have been created but that are unaddressable over the network at the time of selecting the virtual server.

11. A control computer configured to:
select, in response to a request for performing a secure transaction, a virtual server for the secure transaction, wherein the virtual server is configured to perform secure transactions, and the virtual server is unaddressable over a network at the time of selecting the virtual server such that a user cannot transmit network traffic to the virtual server; and
after selecting the virtual server for the secure transaction, update at least one security policy of the virtual server to make the virtual server addressable to the user over the network by an IP address assigned to the virtual server and transmit the IP address of the selected virtual server to the user.

12. The control computer of claim 11, wherein the request for performing the secure transaction specifies a type of the secure transaction, and the control computer is further configured to:
identify a property associated with the specified type, the identified property being applied to the virtual server before the virtual server executes the secure transaction for the user.

13. The control computer of claim 12,
wherein the specified type is one of: transfer of digital assets, secure message delivery, software distribution, and data manipulation and analysis,
wherein when the specified type is transfer of digital assets, the identified property is a maximum allowed amount of a currency for exchange, and
wherein when the specified type is secure message delivery, the identified property is a maximum allowed size of a message.

14. The control computer of claim 11, further configured to:
after transmitting the IP address of the virtual server to the user, determine that a virtual server termination criterion has been satisfied; and
in response to determining that the virtual server termination criterion has been satisfied, terminate the virtual server.

15. The method of claim 1, further comprising:
in response to the request for performing the secure transaction, selecting the IP address and assigning the IP address to the virtual server; and
updating the at least one security policy of the virtual server to allow network traffic to be sent to the virtual server at the selected IP address.

16. The method of claim 1, further comprising:
updating the at least one security policy of the virtual server by specifying a device of the user as being authorized to communicate with the virtual server.

17. The non-transitory computer-readable medium of claim 8, wherein the method further comprises:
in response to the request for performing the secure transaction, selecting the IP address and assigning the IP address to the virtual server; and
updating the at least one security policy of the virtual server to allow network traffic to be sent to the virtual server at the selected IP address.

18. The non-transitory computer-readable medium of claim 8, wherein the method further comprises:
updating the at least one security policy of the virtual server by specifying a device of the user as being authorized to communicate with the virtual server.

19. The control computer of claim 11, further configured to:
- in response to the request for performing the secure transaction, select the IP address and assign the IP address to the virtual server; and
- update the at least one security policy of the virtual server to allow network traffic to be sent to the virtual server at the selected IP address.

20. The control computer of claim 11, further configured to:
- update the at least one security policy of the virtual server by specifying a device of the user as being authorized to communicate with the virtual server.

* * * * *